US00RE41513E

(19) United States
(12) Reissued Patent
Huang et al.

(10) Patent Number: US RE41,513 E
(45) Date of Reissued Patent: Aug. 17, 2010

(54) PAPER-SEPARATING MECHANISM

(76) Inventors: Yin-Chun Huang, 37, No. 12, Lising 1st Rd., Hsinchu 300 (TW); Ji-Mei Tsuei, No. 32, Lane 142, Sec. 3, Jhonghua Rd., Hsinchu City 300 (TW)

(21) Appl. No.: 11/208,133

(22) Filed: Aug. 19, 2005

Related U.S. Patent Documents

Reissue of:
(64) Patent No.: 6,607,191
Issued: Aug. 19, 2003
Appl. No.: 10/063,041
Filed: Mar. 14, 2002

(51) Int. Cl.
*B65H 5/06* (2006.01)

(52) U.S. Cl. ..... 271/10.01; 271/10.09; 271/18; 271/109; 271/129

(58) Field of Classification Search ..... 271/10.01, 271/10.09, 121, 167
See application file for complete search history.

(56) References Cited

U.S. PATENT DOCUMENTS 5,277,417 A * 1/1994 Moritake et al. ..... 271/121
5,727,782 A * 3/1998 Okada ..... 271/121
5,951,002 A * 9/1999 Yokota ..... 271/117

* cited by examiner

*Primary Examiner*—Kaitlin S Joerger
(74) *Attorney, Agent, or Firm*—Stolowitz Ford Cowger LLP

(57) ABSTRACT

A paper-separating plate is adapted for a paper-separating mechanism having a paper-separating roller. The paper-separating plate placed around a side of the paper-separating roller comprises a main body and a cushion. The main body has a surface and a plurality of grooves and the grooves are positioned on the surface. The cushion is positioned on the surface of the main body and covers the grooves. The cushion positioned over the partial grooves is elastically pressed onto the paper-separating roller. The grooves, neighboring one another or each other, linearly extend in a direction substantially parallel with the axis of the paper-separating roller. Besides, the cushion is made of flexible material and the main body is made of rigid material.

25 Claims, 4 Drawing Sheets

PAPER-SEPARATING MECHANISM

Matter enclosed in heavy brackets [ ] appears in the original patent but forms no part of this reissue specification; matter printed in italics indicates the additions made by reissue.

BACKGROUND OF INVENTION

1. Field of the Invention

The invention relates in general to a paper-separating plate with multi-stages. More particularly, the invention relates to a paper-separating plate suitable for a paper-seized mechanism of an automatic document feeder (ADF).

2. Description of the Related Art

An image input/output device, such as a copying machine, a facsimile machine or a scanner, [is provided with] *contains* an image-input system. In general, a document is placed on a glass plate, and an optical system placed under the glass plate is used to read an image, such as words or figures. [In case] *When* the dimensions of documents coincide, the image input/output device can be designed with an automatic document feeder matching the optical system. [Therefore, by the automatic document feeder] *Consequently*, the documents can be transferred one by one [and pass by] *over* the surface of the glass plate[. Meanwhile], *with the use of the automatic document feeder, and* the images of the documents can be read by the linear scanning of the optical system. [Also, the automatic] *Automatic* document feeder*s* can be mounted on a printer*, a copying machine, a facsimile machine, a scanner,* or other machine[s] where a [stake] *stack* of documents [has to separates] *are separated.*

Currently, the automatic document feeder is provided with the paper-separating mechanism in order to transfer documents one by one to a scanning region of the optical system of the image input/output device. FIG. 1 is a cross-sectional view showing a known traditional paper-separating mechanism. A paper-separating mechanism 100 includes a paper-separating roller 110, a paper-feed roller 120 and a paper-separating plate 130. The paper-separating roller 110 and the paper-feed roller 120 are mounted in the automatic document feeder. The axis of the paper-separating roller 100 is substantially parallel with that of the paper-feed roller 120 and the rolling direction of the paper-separating roller 110 is the same as that of the paper-feed roller 120. Besides, the contact surface 132 of the paper-separating plate 130 is elastically pressed onto the bottom surface of both the paper-separating roller 110 and the paper-feed roller 120. For example, one end of the paper-separating plate 130 is pivoted on the automatic document feeder, as shown in the right portion of FIG. 1, while a spring 134 is mounted onto the other end of the paper-separating plate 130, as shown in the left portion of FIG. 1. As a result, the contact surface 132 of the paper-separating plate 130 can be elastically pressed onto the bottom surface of both the paper-separating roller 110 and the paper-feed roller 120.

The [condition that] documents 10 are separated by the paper-separating mechanism 100 [is that] *when* the friction (Fr) between the roller (the paper-separating roller 110 or the paper-feed roller 120) and documents 10 is larger than the friction (Fp) between the paper-separating plate 130 and documents 10 and that the friction (Fp) between the paper-separating plate 130 and documents 10 is larger that the friction (Fd) between documents 10. In other words, the condition that documents 10 are separated by the paper-separating mechanism 100 is "Fr>Fp>Fd". When a stack of documents 10 is transferred into the paper-separating mechanism 100, a first paper-separating operation is performed using the paper-feed roller 120 and the paper-separating plate 130. In an ideal case, documents 10 should be transferred one by one to the space between the paper-separating roller 110 and the paper-separating plate 130 using the paper-feed roller 120 and the paper-separating plate 130. However, two or three sheets of documents 10 may be transferred to the space between the paper-separating roller 110 and the paper-separating plate 130. In [the] *that* case, several sheets of documents 10 are first separated from a stack of documents 10 using the paper-feed roller 120 and the paper-separating plate 130. Subsequently, the several sheets of documents 10 first separated are transferred to the space between the paper-separating roller 110 and the paper-separating plate 130. Next, only one sheet of documents 10 is [second] *then* separated from the several sheets of documents 10 [first separated using the paper-separating roller 110 and the paper-separating plate 130]. However, [provided that] *if* the condition of "Fr>Fp>Fd" is not satisfied, [two or even more sheets of documents 10 can be output after documents 10 are separated using the paper-separating roller 110 of paper-separating mechanism 100 and the paper-separating plate 130. The] *the* documents 10 can not be separated [one by one] *from one another* effectively.

SUMMARY OF INVENTION

Accordingly, an objective of the present invention is to provide a paper-separating plate with multi-stages *that more reliably separates documents*. [The paper-separating plate with multi-stages is suitable for a paper-separating mechanism. The paper-separating effect with multi-stages is provided using the paper-separating plate of the invention so that the success probability of separating documents one by one is enhanced.]

To achieve the foregoing and other objectives, the present invention provides a paper-separating plate adapted for a paper-separating mechanism having a paper-separating roller. The paper-separating plate placed around a side of the paper-separating roller comprises a main body and a cushion. The main body has a surface and a plurality of grooves and the grooves are positioned on the surface. The cushion is positioned on the surface of the main body and covers the grooves. The cushion positioned over the partial grooves is elastically pressed onto the paper-separating roller. The grooves linearly extend in a direction substantially parallel with the axis of the paper-separating roller, the linear grooves neighboring one another or each other. Besides, the cushion is made of flexible material and the main body is made of rigid material.

Both the foregoing general description and the following detailed description are exemplary and explanatory only and are not restrictive of the invention, as claimed. It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. A simple description of the drawings is as follows.

DETAILED DESCRIPTION

Figure 1:
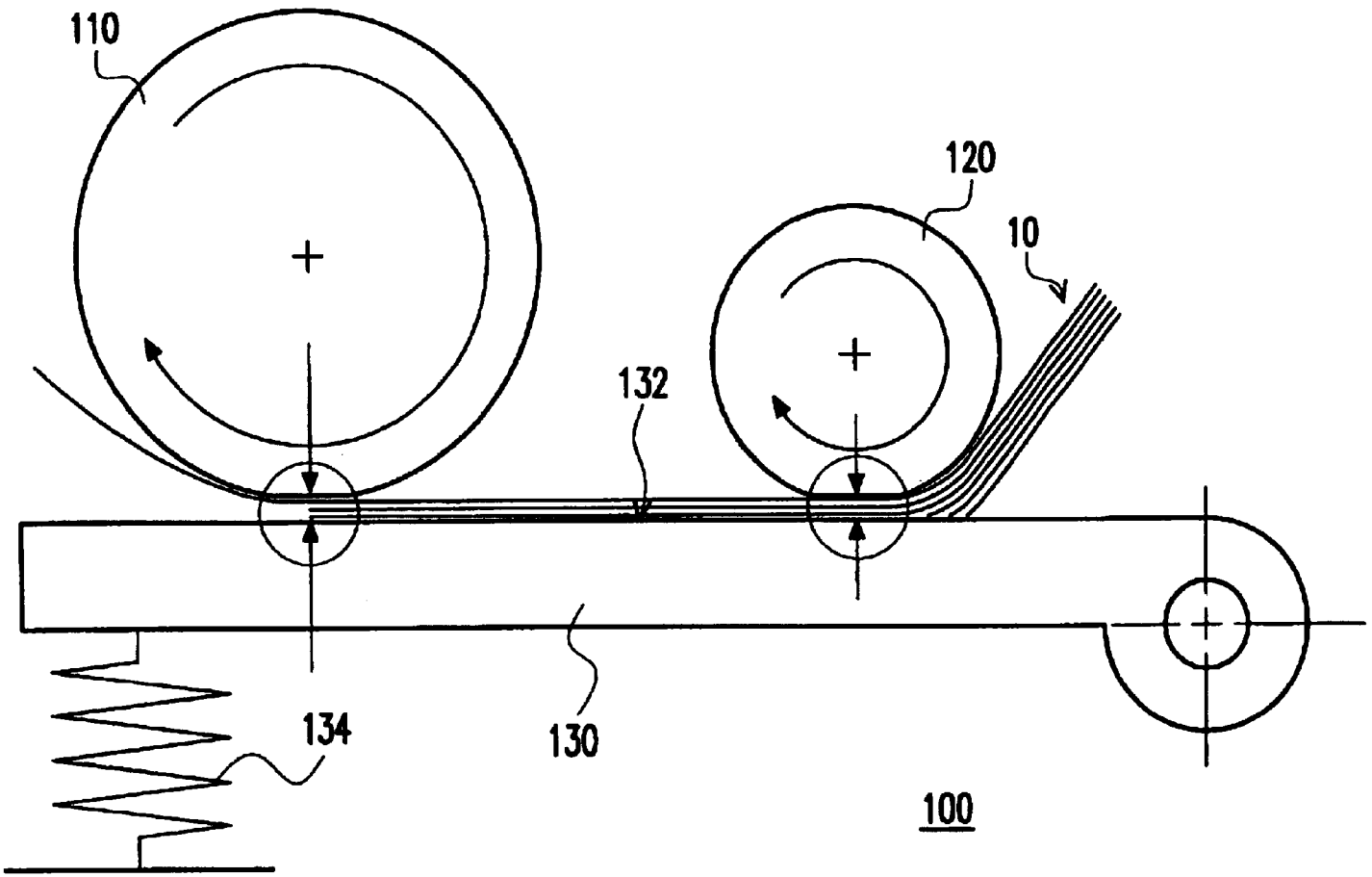
FIG. 1 (PRIOR ART)
FIG. 1 is a cross-sectional view showing a known traditional paper-separating mechanism.
Figure 2:
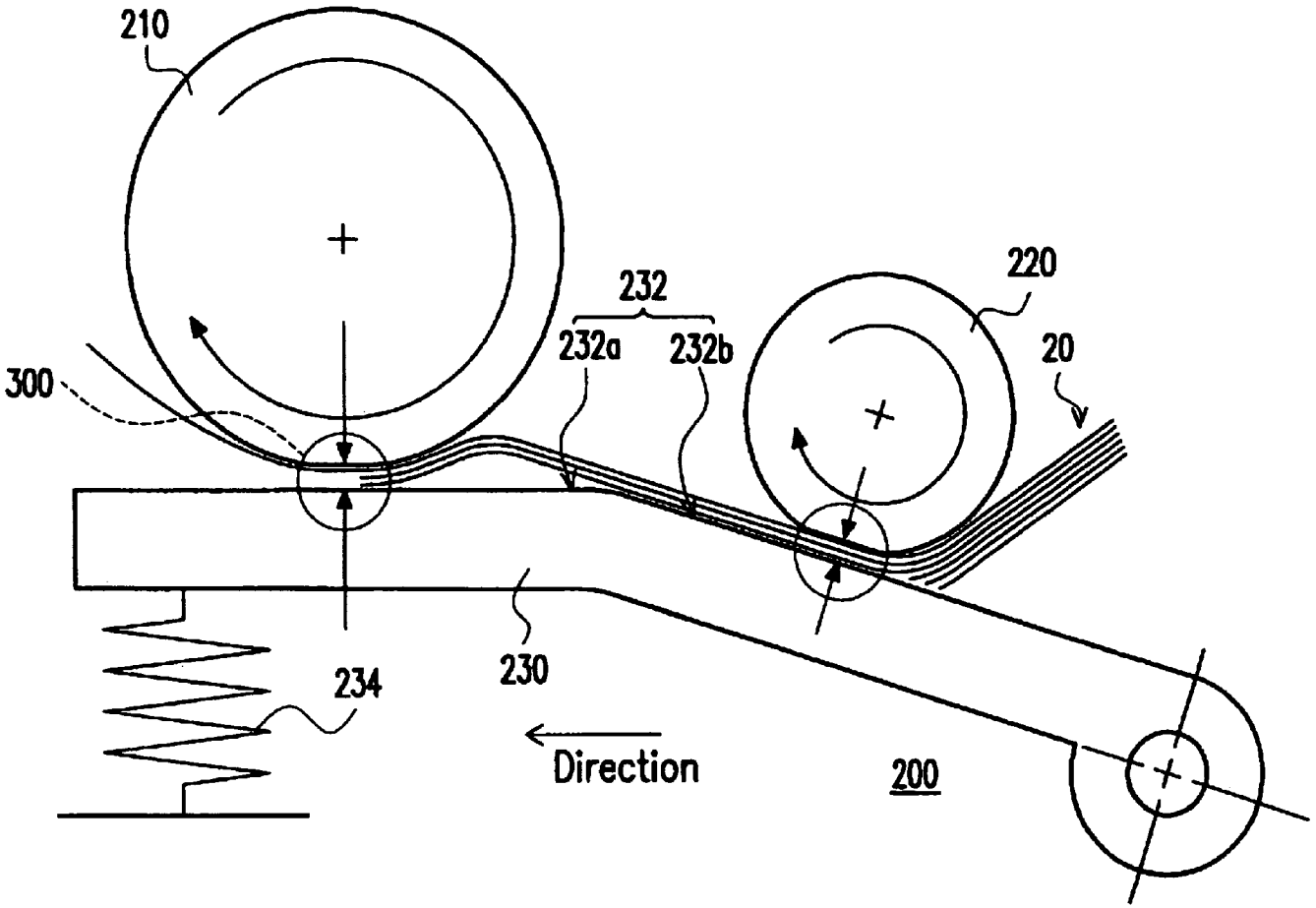
FIG. 2 is a cross-sectional view showing a paper-separating plate with multi-stages according to an embodiment of the present invention. The direction arrow indicates the path of the paper.

Referring to FIG. 2, FIG. 2 is a cross-sectional view showing a paper-separating plate with multi-stages according to an embodiment of the present invention, wherein the paper-separating plate is suitable for a paper-separating mechanism. A paper-separating mechanism 200 includes a paper-separating roller 210, a paper-feed roller 220 and a paper-separating plate 230 with multi-stages. The paper-separating roller 210 and the paper-feed roller 220 are mounted in the automatic document feeder (not shown). The axis of the paper-separating roller 210 is substantially parallel with that of the paper-feed roller 220 and the rolling direction of the paper-separating roller 210 is the same as that of the paper-feed roller 220. Besides, the contact surface 232 of the paper-separating plate 230 is elastically pressed onto the bottom surface of both the paper-separating roller 210 and the paper-feed roller 220. For example, one end of the paper-separating plate 230 is pivoted on the automatic document feeder, as shown in the right portion of FIG. 2, while a spring 234 is mounted onto the other end of the paper-separating plate 230, as shown in the left portion of FIG. 2.

The condition that documents 20 are separated by the paper-separating mechanism 200 is that the friction (Fr) between the roller (the paper-separating roller 210 or the paper-feed roller 220) and documents 20 is larger than the friction (Fp) between the paper-separating plate 230 and documents 20 and that the friction (Fp) between the paper-separating plate 230 and documents 20 is larger that the friction (Fd) between documents 20. In other words, the condition that documents 20 are separated by the paper-separating mechanism 200 is "Fr>Fp>Fd".

Figure 3:
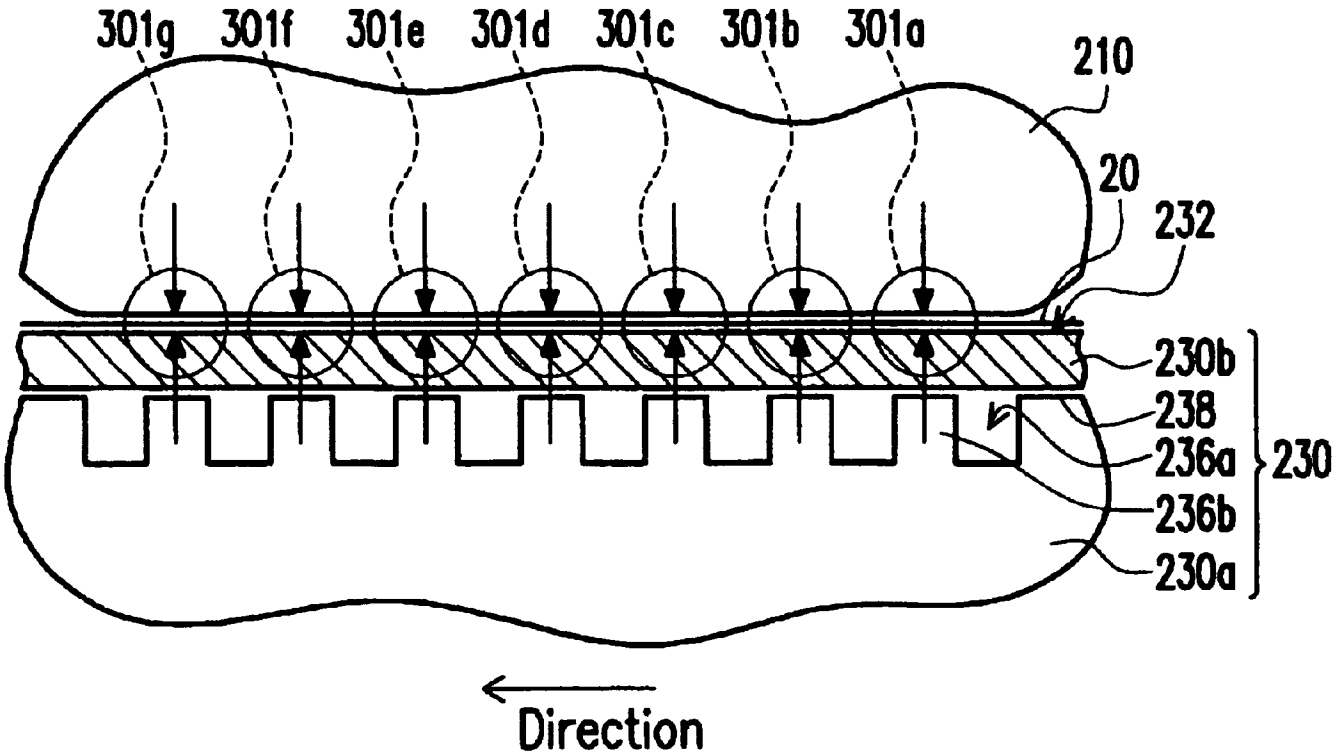
FIG. 3 is a magnified view of regions of the paper-separating plate of FIG. 2. The direction arrow indicates the path of the paper.
Figure 4:
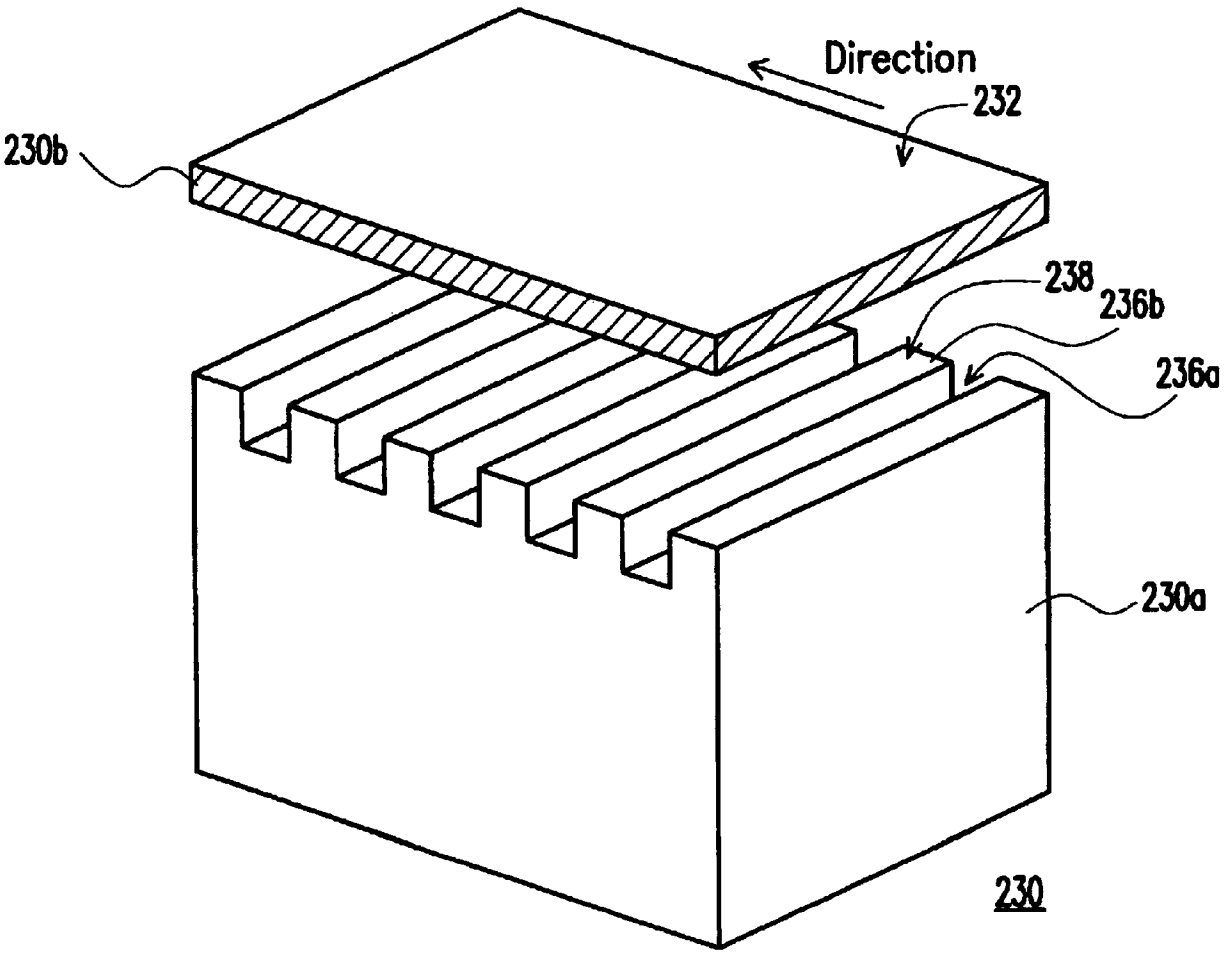
FIG. 4 is a perspective view of a partial structure of the paper-separating plate of FIG. 3. The direction arrow indicates the path of the paper.

Referring to FIG. 3 and FIG. 4, FIG. 3 is a magnified view of regions of the paper-separating plate of FIG. 2. FIG. 4 is a perspective exploded view of a partial structure of the paper-separating plate of FIG. 3. The paper-separating plate 230 with multi-stages is constructed of a main body 230a and a cushion 230b. The main body 230a is provided with [plenty] *a plurality* of linear grooves 236a that are located on a surface 238 of the main body 230a. The linear grooves 236a extend[s] in a direction substantially parallel with the axis of the paper-separating roller 210 and neighbor one another. In other words, the structure between every two [of the] *neighboring* linear grooves 236a [neighbored] can be regarded as a linear protrusion 236b. [Besides] *In addition*, the cushion 230b is placed on the surface 238 of the main body 230a and covers the linear grooves 236a. The cushion 230b can be made of flexible material, while the main body 230a can be made of rigid material.

Referring to both FIG. 2 and FIG. 3, because the paper-separating roller 210 can be made of elastic material, when the paper-separating plate 230 is elastically pressed onto the bottom surface of the paper-separating roller 210, the bottom surface of the paper-separating roller 210 can contact closely with the cushion 230b of the paper-separating plate 230. The bottom surface of the paper-separating roller 210 is [deformed as a flat type] *elastically flattened in the region directly adjacent the paper-separating plate 230*. The cushion 230b positioned over the linear grooves 236a can be deformed as shallow cavities by the pressure applied by the paper-separating roller 210. The pressure applied on the cushion 230b positioned on the linear protrusions 236b is larger than the pressure applied on the cushion 230b positioned over the linear grooves 236a at the two sides of the linear protrusions 236b. The regions of the cushion 230b located on the linear protrusions 236b is defined as linear pressed regions, the circular regions indicated with dotted lines as shown in FIG. 3.

Referring to both FIG. 2 and FIG. 3, when two or more documents 20 are transferred to the space between the paper-separating roller 210 and the paper-separating plate 230 with multi-stages, the documents can be first separated at a first linear pressed region 301a. If not only one document 20 is separated at the first linear pressed region 301a, the retaining documents 20 are transferred to a second linear pressed region 301b and separated again at the second linear pressed region 301b. Then, if not only one document 20 is separated at the second linear pressed region 301b, the retaining documents 20 are transferred to a third linear pressed region 301c and separated again at the third linear pressed region 301c until the documents is output one by one. Also, the documents can be separated at the space between the paper-feed roller 220 and the paper-separating plate 230 with multi-stages.

Referring to FIG. 2, the contact surface 232 of the paper-separating plate 230 with multi-stages can be divided into a first contact surface 232a and a second contact surface 232b. The documents 20 can be separated at the space between the paper-separating roller 210 and the first contact surface 232a, and, also, the documents 20 can be separated at the space between the paper-feed roller 210 and the second contact surface 232b. The paper-separating plate 230 with multi-stages is provided with a turning region, the circular region indicated with dotted lines as shown in the central region of FIG. 2. There is an acute angle between the normal vector of the first contact surface 232a and the normal vector of the second contact surface 232b. After the documents 20 are separated at the space between the paper-feed roller 210 and the second contact surface 232b, the documents 20 are transferred to the outer surface of the paper-separating roller 210 in the direction parallel with the second contact surface 232b. When the documents 20 contact with the outer surface of the paper-separating roller 210, the paper-separating roller 210 stirs [an] *a leading* edge of the documents 20. Thus, the [neighbored] *leading edge of neighboring* documents 20 [are stacked not so closely that] *become separated, thereby allowing* the documents 20 [can] *to* be separated relatively easily when they are transferred to the space between the paper-separating roller 210 and the second contact surface 232b of the paper-separating plate 230. The structure of the paper-separating plate 230 around the paper-separating roller 210 and the paper-feed roller 220 is similar with the structure as shown in FIG. 3.

[To sum up] *In summary*, the present invention has the following advantages:

1. According to the present invention, intensive linear grooves (or linear protrusions) are formed on the main body of the paper-separating plate with multi-stages and a cushion covers the linear grooves and the linear protrusions. Thus, many linear press regions are distributed on the cushion and documents can be separated many times by the paper-separating roller and the paper-separating plate with multi-stages. Therefore, the [successful probability] *likelihood* that documents are output one by one is enhanced.

2. According to the present invention, the paper-separating plate is provided with two contact surfaces with an acute angle therebetween. When documents contact with the outer surface of the paper-separating roller, the paper-separating roller can stir [an] *a leading* edge of the documents. Thus, the [neighbored] *leading edge of neighboring* documents [are stacked not so closely that] *become separated, thereby allowing* the documents [can] *to* be separated relatively easily during following separating operations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A paper-separating plate [adapted for a paper-separating mechanism having a paper-separating roller and the paper-separating plate, placed around a side of the paper-separating roller], comprising:

a main body having a surface [and a plurality of grooves, the grooves] *with at least one groove* positioned on the surface [are], *wherein the at least one groove is* lined in parallel [with respect] to an axis of [the] *a* paper-separating roller; and a cushion positioned on the surface of the main body and covering the *at least one* groove[s], wherein the cushion [positioned over the partial grooves] is elastically pressed onto the paper-separating roller.

2. The paper-separating plate according to claim 1, wherein *the cushion extends over* the [grooves, neighboring one another or each other, linearly extend in a direction substantially parallel with the axis of the paper-separating roller] *at least one groove*.

3. The paper-separating plate according to claim 1, wherein the cushion is made of flexible material.

4. The paper-separating plate according to claim 1, wherein the main body is made of rigid material.

5. A paper-separating mechanism, comprising:

a paper-separating roller; and a paper-separating plate, placed [around a side of] *adjacent to* the paper-separating roller, comprising:

a main body having a [first] surface and a plurality of [first] grooves[, the first grooves] positioned on the [first] surface, *wherein the plurality of grooves* are lined in parallel [with respect] to an axis of the paper-separating roller; and a [first] cushion positioned on the [first] surface of the main body and covering the [first] *plurality of* grooves, wherein the [first] cushion [positioned over the partial first grooves] is elastically pressed onto the paper-separating roller.

6. The paper-separating mechanism according to claim 5, wherein the [first] *plurality of* grooves[, neighboring one another or each other,] linearly extend in a direction substantially parallel [with] *to* the axis of the paper-separating roller.

7. The paper-separating mechanism according to claim 5, wherein the [first] cushion is made of flexible material.

8. The paper-separating mechanism according to claim 5, wherein the main body is made of rigid material.

9. The paper-separating mechanism according to claim 5, [wherein the paper-separating mechanism] further [comprises] *comprising* a paper-feed roller [placed around] *having an axis, wherein the paper-feed roller is located near* the paper-separating roller, and *wherein* the axis of the paper-[separating] *feed* roller is parallel [with that] *to the axis* of the paper-[feed] *separating* roller.

10. A paper-separating mechanism, comprising:

a paper-separating roller *having an axis*;

a paper-feed roller [placed around] *having an axis, wherein the paper-feed roller is located near* the paper-separating roller and [an] *the* axis of the paper-separating roller is *generally* parallel [with that] *to the axis* of the paper-feed roller; and a paper-separating plate, [placed around a side] *located adjacent to an outer diameter* of the paper-separating roller, comprising:

a main body having a first surface [and] *with* a plurality of first grooves, [the first grooves positioned on the first surface, a plurality of second grooves and a second cushion, the second grooves are placed on] a second surface[, the second cushion is placed on the second surface and covers the] *with a plurality of* second grooves, and [the second cushion positioned over the partial second groove is elastically pressed onto the paper-feed roller, and a first cushion positioned on the first surface of the main body and covering the first grooves, wherein the first cushion positioned over the partial first grooves is elastically pressed onto the paper-separating roller] *a cushion positioned on the first and second surfaces of the main body*.

11. The paper-separating mechanism according to claim 10, wherein the *plurality of* second grooves[, neighboring one another or each other,] linearly extend in a direction substantially parallel with the axis of the paper-feed roller.

12. The paper-separating mechanism according to claim 10, wherein the [second] cushion is made of flexible material.

13. The paper-separating mechanism according to claim 10, wherein there is an acute angle between [the] *a* normal vector of the first surface and [the] *a* normal vector of the second surface.

*14. A paper-separating plate, comprising:*

*a main body having a surface with at least one groove; and*

*a cushion positioned on the surface of the main body and covering the at least one groove, wherein the cushion covering the at least one groove is elastically pressed onto a paper-separating roller, and wherein the at least one groove is parallel to an axis of the paper-separating roller.*

*15. The paper-separating plate according to claim 14, wherein the at least one groove linearly extends in a direction substantially parallel to the axis of the paper-separating roller.*

*16. The paper-separating plate according to claim 14, wherein the cushion is made of flexible material.*

*17. The paper-separating plate according to claim 14, wherein the main body is made of rigid material.*

*18. An automatic document feeder, comprising:*

*a paper-separating roller having an axis;*

*a paper-feed roller having an axis, wherein the paper-feed roller is located near the paper-separating roller and the axis of the paper-separating roller is substantially parallel to the axis of the paper-feed roller; and*

*a paper-separating plate, comprising:*

*a single main body having a first cushioned surface elastically pressed toward the paper-separating roller and a second cushioned surface elastically pressed toward the paper-feed roller, wherein the main body comprises a plurality of grooves.*

*19. The automatic document feeder according to claim 18, further comprising a cushion positioned on the main body.*

*20. The automatic document feeder according to claim 19, wherein the cushion is configured to deform into the plurality of grooves located beneath the paper-separating roller.*

*21. The automatic document feeder according to claim 19, wherein the cushion covers the plurality of grooves on the main body.*

*22. The automatic document feeder according to claim 19, wherein the cushion is made of flexible material.*

*23. The paper-separating mechanism according to claim 10, wherein the cushion comprises:*

*a first cushion positioned on the first surface of the main body; and*

*a second cushion positioned on the second surface of the main body.*

*24. The automatic document feeder according to claim 19, wherein there is an acute angle between a normal vector of the first cushioned surface and a normal vector of the second cushioned surface.*

*25. The paper-separating mechanism according to claim 10, wherein the cushion covers the plurality of first grooves and the plurality of second grooves.*

* * * * *